United States Patent
Homewood et al.

(10) Patent No.: US 7,480,783 B2
(45) Date of Patent: Jan. 20, 2009

(54) SYSTEMS FOR LOADING UNALIGNED WORDS AND METHODS OF OPERATING THE SAME

(75) Inventors: Mark O. Homewood, North Somerset (GB); Paolo Faraboschi, Barcelona (ES)

(73) Assignees: STMicroelectronics Limited, Bristol (GB); Hewlett-Packard Company, Palo Alto, CA (US)

( * ) Notice: Subject to any disclaimer, the term of this patent is extended or adjusted under 35 U.S.C. 154(b) by 269 days.

(21) Appl. No.: 10/922,242

(22) Filed: Aug. 19, 2004

(65) Prior Publication Data

US 2006/0010304 A1 Jan. 12, 2006

(30) Foreign Application Priority Data

Aug. 19, 2003 (EP) ................................. 03255133

(51) Int. Cl.
*G06F 12/00* (2006.01)
*G06F 9/26* (2006.01)
*G06F 9/34* (2006.01)

(52) U.S. Cl. ....................... 711/201; 711/217; 712/204; 712/205; 712/206; 712/207; 712/300

(58) Field of Classification Search ................... 711/201
See application file for complete search history.

(56) References Cited

U.S. PATENT DOCUMENTS

| 4,814,976 | A  |   | 3/1989  | Hansen et al.              |
|-----------|----|---|---------|----------------------------|
| 4,860,192 | A  | * | 8/1989  | Sachs et al. ......... 711/3 |
| 5,991,757 | A  | * | 11/1999 | Dahl et al. ........... 707/3 |
| 6,449,706 | B1 |   | 9/2002  | Chen et al.                |
| 6,820,195 | B1 | * | 11/2004 | Shepherd ............ 712/300 |
| 6,829,700 | B2 | * | 12/2004 | Faraboschi et al. ... 712/225 |
| 2002/0108027 | A1 |  | 8/2002 | Miyamori                  |
| 2003/0120903 | A1 | * | 6/2003 | Roussel ............. 712/221 |
| 2004/0030814 | A1 | * | 2/2004 | Kamm et al. ......... 710/35 |

* cited by examiner

*Primary Examiner*—Kevin L Ellis
*Assistant Examiner*—Prasith Thammavong

(57) ABSTRACT

Disclosed are systems for loading an unaligned word from a specified unaligned word address in a memory, the unaligned word comprising a plurality of indexed portions crossing a word boundary, a method of operating the system comprising: loading a first aligned word commencing at an aligned word address rounded from the specified unaligned word address; identifying an index representing the location of the unaligned word address relative to the aligned word address; loading a second aligned word commencing at an aligned word address rounded from a second unaligned word address; and combining indexed portions of the first and second alinged words using the indentified index to construct the unaligned word.

12 Claims, 4 Drawing Sheets

SYSTEMS FOR LOADING UNALIGNED WORDS AND METHODS OF OPERATING THE SAME

The present invention relates to the loading of unaligned words in a computer system.

Computer system memories are normally addressed on a byte-by-byte basis. That is to say, that an instruction which will effect a load from memory identifies an address which is the address of an individual byte. However, the most commonly used instruction which effects a load from a memory loads multiple bytes at a time (e.g. 4 bytes in a 32-bit machine, 8 bytes in a 64-bit machine), commencing at the byte identified in the memory address. In a 32-bit machine, four bytes is referred to as a word. Some machines are capable of loading eight bytes at a time, and these are referred to as a double word on a 32-bit machine.

To efficiently implement such a memory load instruction, physical memories are usually organized in words (or double words), and as a consequence bytes are stored in the memory laid out as words (or double words). FIG. 1 illustrates the storage components of a typical computer system, including a memory 2, a cache memory 4, a CPU 6 and a register file 8. Bytes are laid out in the memory 2 as words or double words. In the example illustrated in FIG. 1, each word has four bytes and for ease of reference the words are numbered by their byte address. For example, the address Word 04 identifies the collection of bytes byte 04 to byte 07. Addresses which are multiples of four are referred to herein as aligned word addresses.

In FIG. 1, Word 00, Word 04 and Word 08 represent aligned word addresses. Organisation of the memory data in this way allows efficient reading and writing of words, since the words are organised and addressed as aligned groups of bytes. For example, it allows a read of byte 04 to byte 07 to be made by a single 32 bit access to the memory identifying the address Word 04. This is illustrated in FIG. 1 by the arrow labelled Read [Word 04] which indicates a read instruction being executed by the CPU 6 and applied to the cache 4 to see whether the word 04 is in the cache. If it is not, it is loaded from the memory 2 into the cache 4 and then accessed into the register file 8, where it is shown stored in the register R1.

Compilers and operating systems deliberately prefer to generate aligned addresses, since their storage and execution is most efficient. In addition, in cached or paged memory systems, it is guaranteed that only one cache miss or page exception will be generated since these mechanisms are always aligned to word boundaries. This is usually possible because compilers and operating systems enforce the allocation of word (or larger) data to be aligned at word (or double word) boundaries.

In certain cases however so-called misaligned word accesses are desirable. This happens when we have to load long sequences of multiple bytes (or half-words), whose alignment is unknown (because, for example, we are handed a random pointer to an array of bytes). In these cases, when the machine lacks support for misaligned wide loads, the only option is to resort to a very inefficient sequence of short (e.g., byte-wide) loads. Support for a misaligned or unaligned word allows wide accesses that commence at an address which is not aligned to a word boundary, and enables to load multiple smaller quantities (e.g., bytes) even when their alignment is unknown. Such accesses normally occur from legacy code, or densely packed data structures. Digital audio and video data are often held and accessed in a misaligned way for maximum codec efficiency.

The operation required to load a misaligned word is different to that which has been discussed above. Accessing a non-aligned word from a word aligned memory intrinsically requires two accesses to be made to the memory, and two parts of the misaligned word to be combined. This is illustrated in FIG. 2. Consider for example an access to address word 03, that is byte 03 to byte 06 (shown shaded in FIG. 2). This requires an access to the memory 2 to read Word 00, labelled Access 1 and a subsequent access to Word 04, labelled Access 2. A combining function is then required to load the required word byte 03 to byte 06 into R1. The combining function is denoted generally by reference numeral 10 but in fact can take a number of different forms. Known ways of implementing the read, read and combination sequence are as follows.

1. Automatically by the processor hardware.

The load is executed normally and the data is returned some time later, any delay being automatically hidden by the processor. In this case, the user code has no knowledge of the execution of misaligned accesses, except possibly insofar as it impacts performance. This solution has the disadvantage of (1) requiring additional hardware complexity, and, (2) adding this hardware complexity to every load (even if they are aligned), with a likely impact on the timing of every memory operation.

2. Processor takes a misaligned exception.

The exception handler performs the two reads and combination operation. The exception is removed and returned from as if the processor performed the misaligned exception. In this way, misaligned operations can be performed without changes to user code. This approach has the disadvantage of taking a large number of cycles (tens or hundreds) for the processor to invoke the exception handler, emulate the instruction containing the misaligned access and executing the fixup code. In other words, the exception approach only handles the case in which we have to be able to correctly support misaligned loads (for example, because of legacy code), but we are not concerned with their performance.

3. Where the user code knows misaligned addresses.

In the case where the user code knows misaligned addresses are likely to be accessed, it can deal with them itself either via a library call or some other mechanism. Certain code sequences are known to perform misaligned accesses in certain places, for example X windows system, IP stack manipulation, and these can therefore be coded around. To perform a misaligned access in user code, two read operations must be performed and the data is subsequently combined manually. This approach requires the application programmer to manually identify the data structures or the code sequences that can potentially generate misaligned loads and replace them with a specialized library call.

U.S. Pat. No. 4,817,976 discloses a RISC ("Reduced Instruction Set Computer") device with a method for handling unaligned references. A set of four instructions are provided which allow either the loading or the storage of an unaligned reference. Two instructions deal with loading and two instructions deal with storing. The load instructions constitute a pair, one of which loads a lower aligned word (from the misaligned address) and the other of which takes this word as the parameter, loads the second, upper aligned word and produces the misaligned word as a result.

Thus, this reduces the operation to the execution of two instructions, and the two loads which are performed from memory are both on aligned word addresses. As such, each can produce only one cache miss or TLB misexception.

The system described in U.S. Pat. No. 4,814,976 allows misaligned accesses to be performed using a pair of instructions. This means however that when a number of sequential loads are being performed, each to misaligned data, each word requires two loads. This has the consequence that two cache access operations are to be performed for each load. In current systems, cache accesses are a limiting factor in improving performance and therefore it is desirable to reduce the number of cache accesses to a minimum while still allowing efficient misaligned accesses to be performed.

This is particularly important where audio or video digital data are stored, because these require sequential loads each to misaligned data.

To address the above-discussed deficiencies of the prior art, an aspect of the present invention provides a method of loading an unaligned word from an unaligned word address in a memory, the unaligned word comprising a plurality of indexed portions crossing a word boundary, the method comprising: loading a first aligned word commencing at an aligned word address rounded from said unaligned word address; identifying an index (MAstate) representing the location of the unaligned word address relative to the aligned word address; loading a second aligned word commencing at an aligned word address rounded from the unaligned word address plus an offset; and combining indexed portions of the first and second aligned words using the identified index to construct the unaligned word.

Another aspect of the invention provides a method of loading an unaligned word from a specified unaligned word address in a memory, said unaligned word comprising a plurality of indexed portions crossing a word boundary, the method comprising: loading a first aligned word commencing at an aligned word address rounded from said specified unaligned word address; identifying an index representing the location of the unaligned word address relative to the aligned word address; loading a second aligned word commencing at an aligned word address rounded from a second unaligned word address; and combining indexed portions of the first and second aligned words using the identified index to construct the unaligned word.

Another aspect of the invention provides a method of operating a computer to load an unaligned word from an unaligned word address in a memory, said unaligned word comprising a plurality of indexed portions crossing a word boundary, the method comprising: executing a first instruction which identifies an unaligned word address and an index representing the location of the unaligned word address relative to its rounded aligned word address, the instruction causing the load of a first word from said rounded aligned word address; executing a second instruction which identifies the unaligned word address plus an offset together with said index, and which causes the loading of a second aligned word commencing at an aligned word address rounded from the unaligned word address plus the offset; and executing a third instruction which causes indexed portions of the first and second aligned words to be combined using the identified index to construct the unaligned word.

A further aspect provides a method of operating a computer to load an unaligned word from an unaligned word address in a memory, said unaligned word comprising a plurality of indexed portions crossing a word boundary, the method comprising: executing a first instruction which identifies an unaligned word address and an index representing the location of the unaligned word address relative to its rounded aligned word address, the instruction causing the load of a first word from said rounded aligned word address; executing a second instruction which identifies the unaligned word address plus an offset together with said index, and which causes the loading of a second aligned word commencing at an aligned word address rounded from the unaligned word address plus the offset; and executing a third instruction which causes indexed portions of the first and second aligned words to be combined using the identified index to construct the unaligned word.

A further aspect provides a computer system comprising a memory holding unaligned words at unaligned word addresses, each unaligned word comprising a plurality of indexed portions crossing a word boundary; and an execution unit arranged to execute an instruction sequence which implements the following steps: loading a first aligned word commencing at an aligned word address rounded from said unaligned word address; identifying an index representing the location of the unaligned word address relative to the aligned word address; loading a second aligned word commencing at an aligned word address rounded from a second unaligned word address; and combining indexed portions of the first and second aligned words using the identified index to construct the unaligned word.

A further aspect provides a computer program product comprising program code means which when loaded into a computer cause the computer to effect the following steps: loading a first aligned word commencing at an aligned word address rounded from said unaligned word address; identifying an index representing the location of the unaligned word address relative to the aligned word address; loading a second aligned word commencing at an aligned word address rounded from a second unaligned word address; and combining indexed portions of the first and second aligned words using the identified index to construct the unaligned word.

A further aspect provides a computer program product comprising program code means including a sequence of instructions comprising: a first instruction which identifies a unaligned word address and an index representing the location of the unaligned word address relative to its rounded aligned word address, the instruction causing the load of a first word from said rounded aligned word address; a second instruction which identifies the unaligned word address plus an offset together with said index, and which causes the loading of a second aligned word commencing at an aligned word address rounded from the aligned word address plus the offset; and a third instruction which causes indexed portions of the first and second aligned words to be combined using the identified index to construct the unaligned word.

Before undertaking the DETAILED DESCRIPTION OF THE INVENTION below, it may be advantageous to set forth definitions of certain worlds and phrases used throughout this patent document: the terms "include" and "comprise," as well as derivatives thereof, mean inclusion without limitation; the term "or," is inclusive, meaning and/or; the phrases "associted with" and "associated therewith," as well as derivatives thereof, may mean to include, be included within, interconnect with, contain, be contained within, connect to or with, couple to or with, be communicable with, coorperate with, interleave, juxtapose, be proximate to, be bound to or with, have, have a property of, or the like; and the terms "system", "computer system" and "processor" ay be used interchangeably and mean any device, system or part thereof that controls at least one opertation, such a device may be implemented in hardware, firmware or software, or some combination of at least two of the same. It should be noted that the functionality associated with any particular system or processor may be centralized or distubuted. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a better understanding of the present invention and to show how the same may be carried into effect, reference will now be made by way of example to the accompanying drawings, in which like reference numerals represent like parts, and in which.

DETAILED DESCRIPTION OF THE INVENTION

Figure 3:
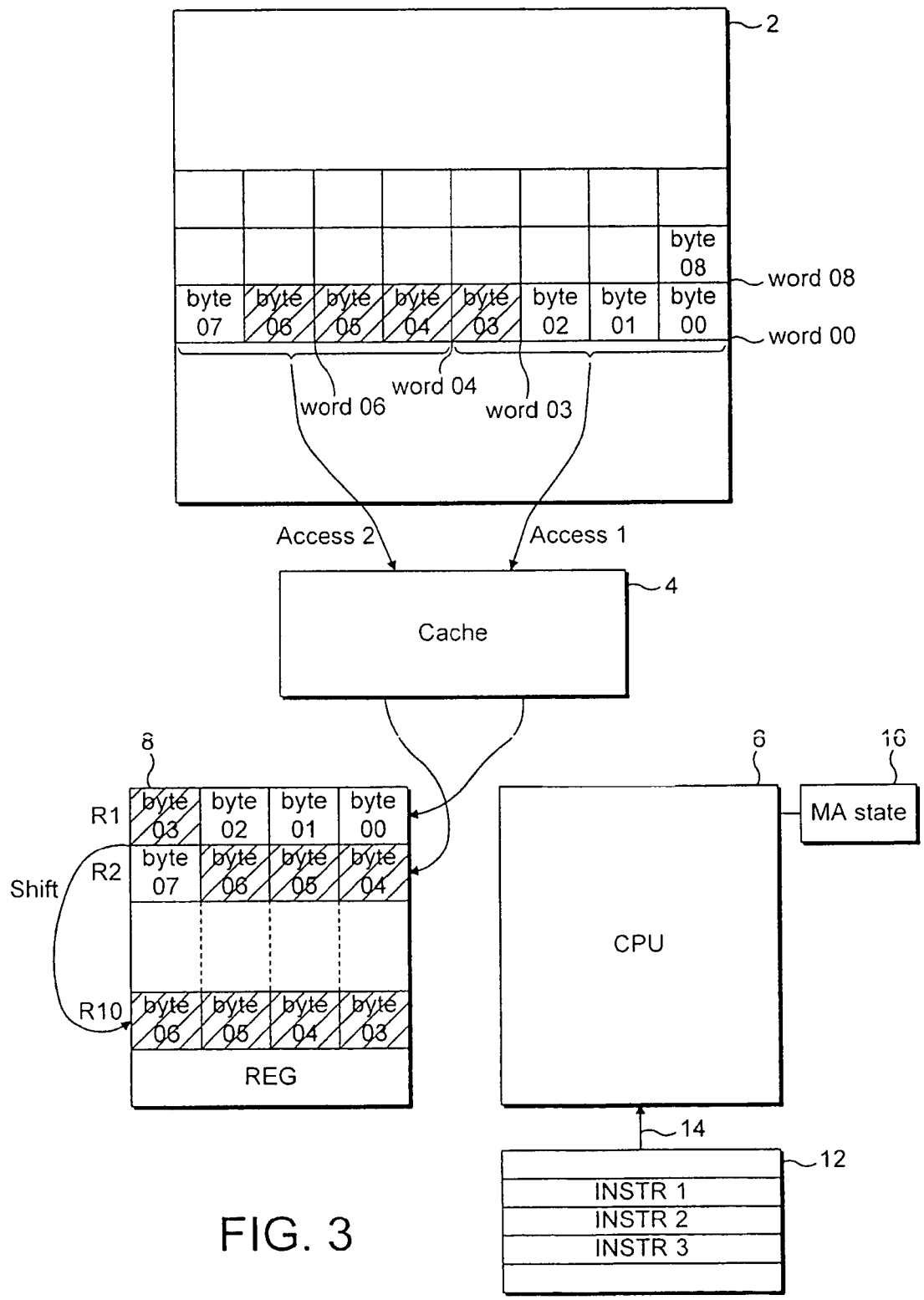
FIG. 3 is a schematic diagram of storage components of a computer system illustrating a method of loading unaligned words in accordance with one embodiment of the invention.
Figure 4:
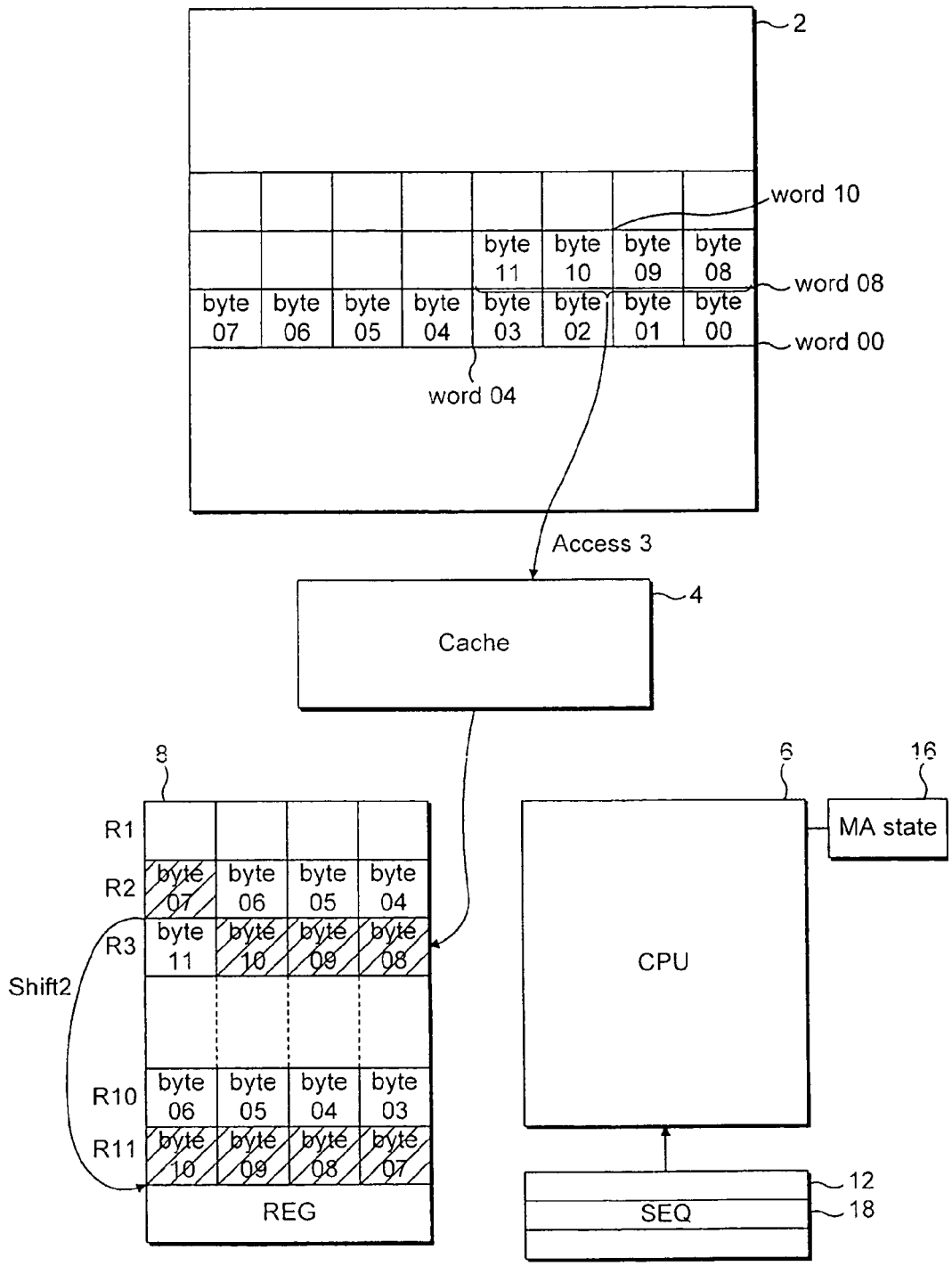
FIG. 4 is a schematic diagram along the lines of FIG. 3, illustrating sequential accesses.

FIGS. 3 through 4, discussed below, and the various embodiments used to describe the principles of the present invention in this patent document are by way of illustration only and should not be construed in any way to limit the scope of the invention. Those skilled in teh art will understand that the priciples of the present invention may be implemented in any suitably arranged computer, or like processing enviorment.

Figure 1:
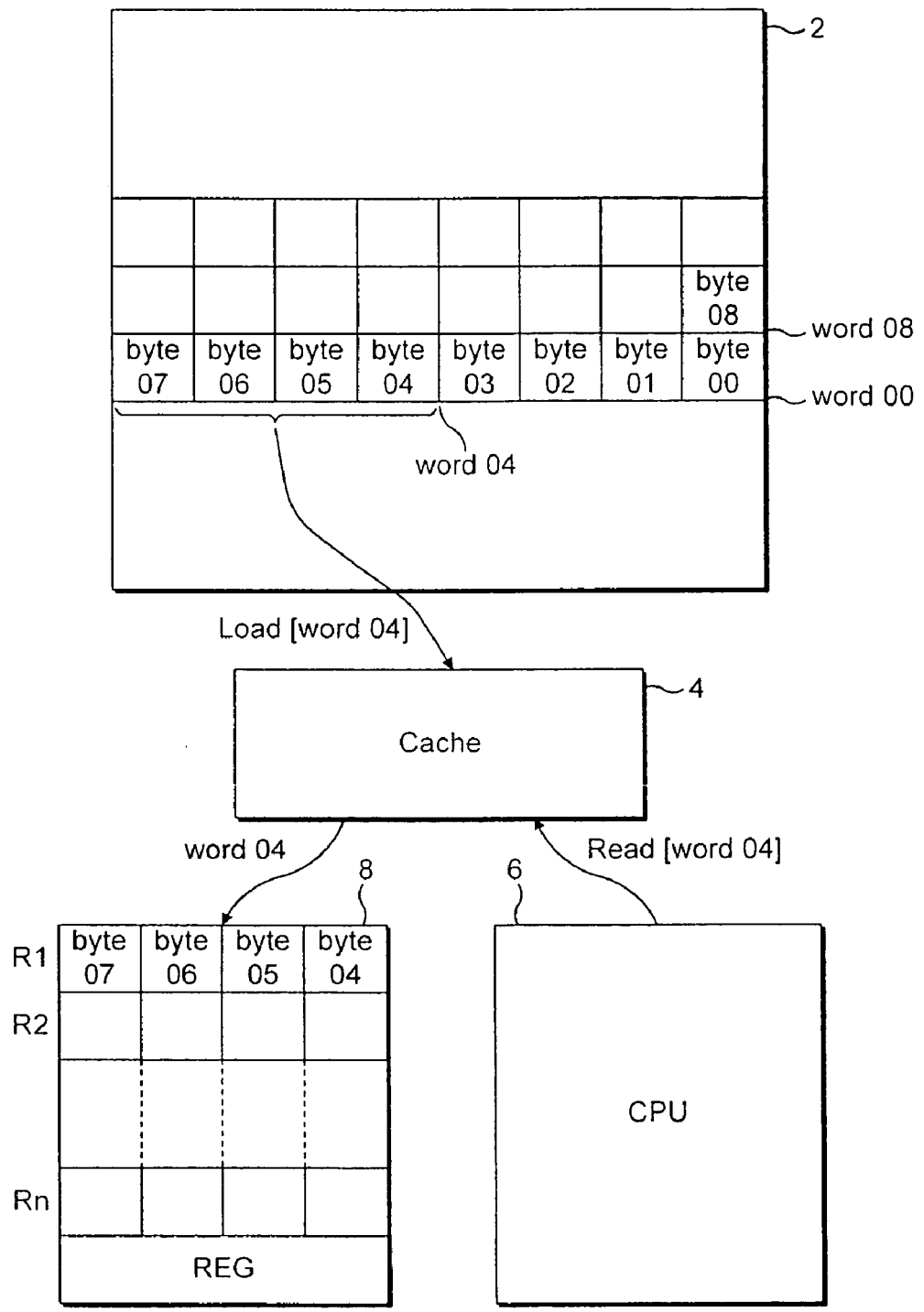
FIG. 1 is a schematic diagram of storage components of a computer system illustrating aligned loads.
Figure 2:
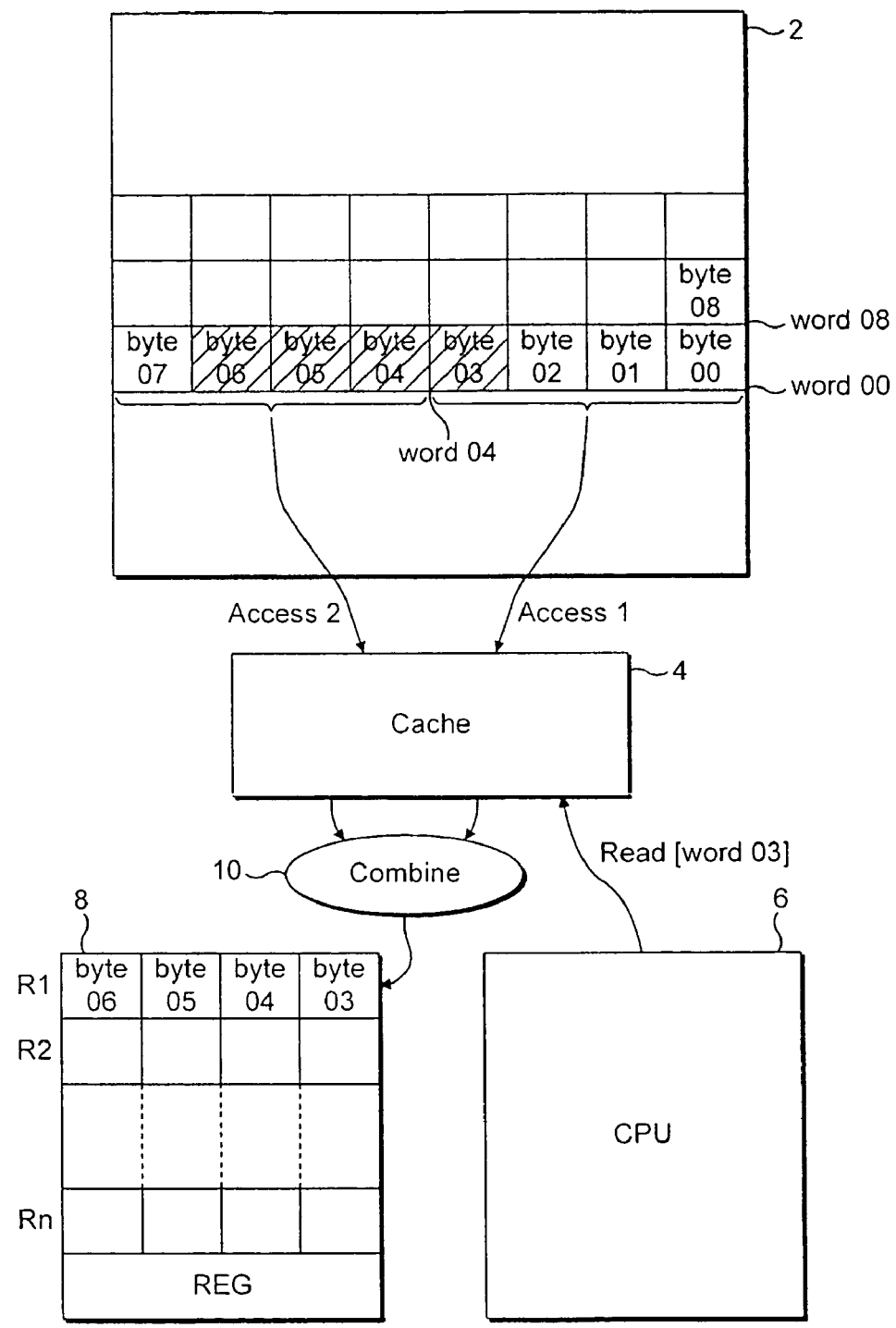
FIG. 2 is a schematic diagram of storage components of a computer system illustrating unaligned loads.

Turning to FIG. 3, illustrated is a schematic block diagram of storage components of a computer system to illustrate an embodiment of the invention. Concurrent reference is made to the systems of FIGS 1 and 2 where appropriate. FIG. 3 additionally illustrates an instruction memory 12 which holds computer instructions for supply to the CPU 6 for execution to control memory accesses. This memory 12 could form part of the same memory which is denoted 2 and which holds the data to be accessed, or it may be a separate memory. An exemplary code sequence INSTR1, INSTR2, INSTR3 is illustrated being held in the instruction memory 12, the code sequence being as follows:

INSTR1 LoadAligned (PotentialMisAligned→R1, MAstate);
INSTR2 LoadAligned (PotentialMisAligned+3→R2, IGNORED);
INSTR3 MisAExtract (R1, R2, MAstate→R10);

This code sequence includes two novel instructions: LoadAligned and MisAExtract. Instructions INSTR1 and INSTR2 are LoadAligned instructions, and INSTR3 is the MisAExtract instruction. The variable PotentialMisAligned in the LoadAligned instruction is the address in memory which is to be accessed, which may be misaligned. R1 denotes the register for holding the result of the load from memory, and the variable MAstate represents an index which denotes the misalignment state of the datum which is being loaded in bytes. MAstate comprises n bits, where n is the maximum number of bits required to represent the misalignment of the datum. For 32 bit datums, this is 2 bits and for 64 bit datums this is 3 bits. The CPU has a location 16 for holding this variable MAstate. Once the variable MAstate has been set up, it is not needed in subsequent instructions, so the field for it is tagged "IGNORED". Execution of the first LoadAligned instruction involves determining the effective address, rounding the effective address to a word boundary and then fetching the word commencing at that word boundary. In the case of the first LoadAligned instruction, INSTR1, the effective address is PotentialMisAligned. In FIG. 3, in the example given this is Word 03. Thus, execution of the first LoadAligned instruction causes Word 00 to be fetched (denoted Access 1 in FIG. 3) and loaded into register R1 in the register file 8.

The effective address in the second load aligned instructions INSTR2 is calculated as Word 03+3 (where 3 is the offset specified in the instruction)=Word 06. This rounds to Word 04 which is labelled Access 2 in FIG. 3. Accordingly, Bytes 04 to 07 are loaded into register R2. In this case, the index MAstate=11 (representing a misalignment of 3) and this is held in the location 16. For a 64-bit machine, the effective address in the second "load aligned" instruction INSTR2 would be calculated by adding 7 instead of 3.

Execution of the third instruction, MisAExtract, causes the misaligned word to be extracted from the registers R1, R2 using the index MAstate, and loads the resulting word into the destination register R10. To accomplish this, the CPU performs a byte shift operation on the register file to copy the shaded bytes into the register R10. This operation is denoted diagrammatically by the line labelled Shift in FIG. 3.

As an alternative to holding MAstate as an instruction field, the variable PotentialMisaligned can be passed to the MisAExtract operations, if the target architecture supports 3-operand operations.

In this case, the three instructions are:
INSTR1 R1<=LoadAligned (PotentialMisaligned+0)
INSTR2 R2<=LoadAligned (PotentialMisaligned+3)
INSTR3 R10<=MisalignedExtract(R1, R2, PotentialMisaligned)//this is 3 operands In this case, the index is derived from PotentialMisaligned.

Another possible syntax for the instructions is given below:
INSTR0 MAstate<=PotentialMisaligned & 3
INSTR1 R1<=LoadAligned (PotentialMisaligned+0)
INSTR2 R2<=LoadAligned (PotentialMisaligned+3)
INSTR3 R10<=MisalignedExtract(R1, R2, MAstate)//this is 2operands+a 2b flag In this case, the misalignment gets stored to MAstate, which is assigned to PotentialMisaligned+4 (or PotentialMisaligned+8 for 64b).

There follows an example of semantics for big-endian, 32b code.

```
int MisalignedExtract (int s1, int s2, int index)
{
    int t;
    switch (index & 3) { // index=MAstate, or
index=PotentialMisaligned
        case 0:
            t = s1;
            break;
        case 1:
            t = (s1 << 8) | ((unsigned) s2 >> 24);
            break;
        case 2:
            t = (s1 << 16) | ((unsigned) s2 >> 16);
            break;
        case 3:
            t = (s1 << 24) | ((unsigned) s2 >> 8);
            break;
    }
    return t;
}
int LoadAligned (int address)
{
    int aligned_address = address & (~3); // force alignment
    return LoadWord (aligned_address);
}
```

Turning next to FIG. 4, illustrated is the same scheme as FIG. 3, but this embodiment exemplifies a situation where a sequence of misaligned loads are performed. In this case, the instruction memory 12 holds a code sequence 18 as follows:

LoadAligned (PotentialMisAligned→R1,MAstate);
LoadAligned (PotentialMisAligned+3→R2,IGNORED);
MisAExtract (R1, R2, MA state→R10)
LoadAligned (PotentialMisAligned+7→R3, IGNORED);
MisAExtract (R2, R3, MAstate→R11)
LoadAligned (PotentialMisAligned+11→R4, IGNORED);
MisAExtract (R3, R4, MAstate→R12)
LoadAligned (PotentialMisAligned+15→R5,IGNORED);
MisAExtract (R4, R5, MAstate→R13)
LoadAligned (PotentialMisAligned+19→R6, IGNORED);
MisAExtract (R5, R6, MAstate→R14)
LoadAligned (PotentialMisAligned+23→R7, IGNORED);
MisAExtract (R6, R7, MAstate→R15)
LoadAligned (PotentialMisAligned+27→R8, IGNORED);
MisAExtract (R7, R8, MAstate→R16)
LoadALigned (PotentialMisAligned+31→R9, IGNORED);
MisAExtract (R8, R9, MAstate→R17)

(It will be appreciated the instruction syntax variants discussed above also apply here.)

The first three instructions in this code sequence are the same as those which have already been described which have had the effect of loading the first unaligned word into the register R10. The next instruction is another LoadAligned instruction taking the unaligned word address Word 03 and adding an offset of 7 to it to result in the unaligned word address Word 10. In execution of this LoadAligned instruction, that effective address is rounded to an aligned word address Word 08 resulting in an access of byte 08 to byte 11 into the register R3. This is labelled Access 3 in FIG. 4. The subsequent MisAExtract instruction then implements a shift operation labelled Shift 2 in FIG. 4 which shifts the shaded bytes from registers R2 and R3 into the register R11 to result in the subsequent load of the next misaligned word. Execution of the subsequent instructions have similar effects resulting in a load operation followed by a shift operation in each case. Therefore, although three instructions are used to load the first piece of misaligned data, only two instructions are then used for each additional piece of misaligned data. Moreover, these involve only a single access to the cache in each case. That is, for N sequential misaligned loads, only N+1 aligned loads (representing N+1 cache accesses) and N extract (shift) operations need be performed. This compares very well with the existing solutions, for example that in U.S. Pat. No. 4,814,976 where 2N aligned loads would be required.

Another alternative with groups of misaligned loads is to separate the LoadAligned instruction into an operation generating the index MAstate and doing the aligned load as two operations. In a loop, only the load would be necessary since the alignment calculation (to generate MAstate) and alignment of the misaligned pointer could be done as a header to the loop. For example:

```
LoadAligned
{
    MAstate = PotentialMisaligned & 3 (Invariant in sequence)
    NotMisAligned = PotentialMisaligned & ~ 3
    (+ 4 on each iteration)
    R -< Load (not Misaligned);
}
``` i.e. a generic load could be used with almost the same efficiency for sequences of operations.

In a pipelined system with instruction-level parallelism that enables concurrent execution of memory loads and extracts, the extraction/shift operation can be overlapped with subsequent load operations. With instructions scheduled in this way, the aligned load time can be reduced to N cycles+Ld latency+extract latency. For example, in an architecture where the load latency is three cycles and the extract latency is a single cycle, this produces a latency of 4+N cycles. As such, the system described herein achieves a significant speed and cache utilisation improvement over existing schemes.

Note that the addressing scheme described here is little endian. However, big endianness works in the same way even though the precise implementation of LoadAligned and MisalignedExtract is different for big and little endian machines, The invention can equally well be applied to other addressing schemes and in particular to big endian addressing schemes. Moreover, although the invention has been described in relation to four byte words, it will be appreciated that different size datums can be loaded using the same mechanism. For example, the only change for a 64-bit machine would be a different size of MAstate (3 bits), and different increments for the successive load operations (+7, +15, +23, +31, ... ). It is intended that the present invention encompass such changes and modifications as fall within the scope of the appended claims.

What is claimed is:

1. A method of loading a sequence of unaligned words starting from a first unaligned word address in a memory, said unaligned words comprising a plurality of indexed portions crossing a plurality of word boundaries, the method comprising:

loading a first aligned word by executing a load instruction, said first aligned word commencing at a first aligned word address rounded from said first unaligned word address;

identifying an index representing the location of the first unaligned word address relative to the first aligned word address;

loading a second aligned word commencing at a second aligned word address rounded from a second unaligned word address;

combining indexed portions of the first and second aligned words using the identified index to construct a first unaligned word;

loading at least one subsequent third aligned word commencing at a third aligned word address from a subsequent third unaligned word address plus a second offset; and combining indexed portions of the subsequent third aligned word and the second aligned word to construct a subsequent second unaligned word.

2. A method according to claim 1, wherein the second unaligned word address is said first unaligned word address plus an offset.

3. A method according to claim 1, wherein the subsequent third unaligned word address is the first unaligned word address plus the second offset.

4. A method according to claim 1, wherein the index is stored as a state.

5. A method according to claim 1, wherein the index is a multibit index.

6. A method according to claim 5, wherein the multibit index comprises n bits, where n is the maximum number of bits required to represent the misalignment of the word.

7. A method according to claim 1, wherein the step of combining indexed portions is implemented by loading indexed portions of the first and second aligned words from respective first and second registers into a destination register for the first unaligned word.

8. A computer system comprising a memory holding unaligned words at unaligned word addresses, each unaligned word comprising a plurality of indexed portions crossing a word boundary; and an execution unit arranged to execute an instruction sequence which implements the following steps:

executing a load instruction to load a first aligned word commencing at a first aligned word address rounded from a first unaligned word address;

said load instruction identifying an index representing the location of the first unaligned word address relative to the first aligned word address;

loading a second aligned word commencing at a second aligned word address rounded from a second unaligned word address;

combining indexed portions of the first and second aligned words using the identified index to construct a first unaligned word;

loading at least one subsequent third aligned word commencing at a third aligned word address rounded from a subsequent third aligned word address plus a second offset; and combining indexed portions of the subsequent third aligned word and the second aligned word to construct a subsequent second unaligned word.

9. A computer system according to claim 8, which comprises means for storing the index as a state.

10. A computer system according to claim 8, which comprises a register file comprising first and second registers for holding the first and second aligned words and a destination register for holding the first unaligned word.

11. A computer program product comprising program code means which when loaded into a computer cause the computer to effect the following steps:

loading a first aligned word commencing at a first aligned word address rounded from a first unaligned word address;

identifying an index representing the location of the first unaligned word address relative to the first aligned word address;

loading a second aligned word commencing at a second aligned word address rounded from a second unaligned word address;

combining indexed portions of the first and second aligned words using the identified index to construct a first unaligned word, wherein loading said first aligned word is implemented using a load instruction which identifies said index; loading a third aligned word commencing at a third aligned word address rounded from a third unaligned word address; and combining indexed portions of the second and third aligned words using the identified index to construct a second unaligned word.

12. A computer program product comprising program code means including a sequence of instructions comprising:

a first instruction which identifies a first unaligned word address and an index representing the location of the first unaligned word address relative to its rounded first aligned word address, the instruction causing the load of a first word from said first rounded aligned word address;

a second instruction which identifies the first unaligned word address plus a first offset together with said index, and which causes the loading of a second aligned word commencing at a second aligned word address rounded from the first aligned word address plus the first offset;

a third instruction which causes indexed portions of the first and second aligned words to be combined using the identified index to construct a first unaligned word;

a fourth instruction which causes the loading of a third aligned word commencing at a third aligned word address rounded from the first unaligned word address plus a second offset; and a fifth instruction which causes indexed portions of the second and third aligned words to be combined using the identified index to construct a second unaligned word.

* * * * *